(12) United States Patent
Satoh et al.

(10) Patent No.: US 6,609,266 B1
(45) Date of Patent: Aug. 26, 2003

(54) WIPER MOTOR

(75) Inventors: Susumu Satoh, Yokohama (JP); Hiroyuki Satoh, Yokohama (JP)

(73) Assignee: Jidosha Denki Kogyo Kabushiki Kaisha, Kanagawa-Prefecture (JP)

( * ) Notice: Subject to any disclaimer, the term of this patent is extended or adjusted under 35 U.S.C. 154(b) by 532 days.

(21) Appl. No.: 09/606,676

(22) Filed: Jun. 30, 2000

(30) Foreign Application Priority Data

Jul. 12, 1999 (JP) ............................................ 11-197287

(51) Int. Cl.$^7$ ................................ B60S 1/06; B60S 1/22
(52) U.S. Cl. ................ 15/250.13; 15/250.3; 200/19.07; 200/19.01; 318/DIG. 2
(58) Field of Search ....................... 15/250.16, 250.17, 15/250.3, 250.13, 250.12; 318/DIG. 2, 443, 11; 200/501, 19.07, 61.39, 19.06, 19.01

(56) References Cited

U.S. PATENT DOCUMENTS

| | | | | |
|---|---|---|---|---|
| 2,899,510 A | * | 8/1959 | Merriam | 200/61.39 |
| 4,670,695 A | * | 6/1987 | Licata et al. | 318/443 |
| 4,700,026 A | * | 10/1987 | Kamiyama et al. | 200/19.07 |
| 4,918,272 A | * | 4/1990 | Nishikawa | 200/501 |
| 5,068,500 A | * | 11/1991 | Kitada | 200/19.01 |
| 5,333,351 A | * | 8/1994 | Sato | 15/250.13 |
| 5,422,449 A | * | 6/1995 | Kano et al. | 200/19.01 |
| 5,917,298 A | * | 6/1999 | Miller | 318/444 |
| 5,998,949 A | * | 12/1999 | Amagasa | 318/280 |

FOREIGN PATENT DOCUMENTS

FR 2481537 * 10/1981 ............... 15/250.17

* cited by examiner

*Primary Examiner*—Gary K. Graham
(74) *Attorney, Agent, or Firm*—Sughrue Mion, PLLC

(57) ABSTRACT

A wiper motor suitably applied to the wiper apparatus possible to solve a difference in the wiping range caused by the difference in the operation speed of the wiper blade by the wiper linkage used with an eccentric mechanism, which is provided with a semi-ringshaped high-potential plate connected with the power source, a semi-ringshaped low-potential plate grounded and disposed oppositely to the high-potential plate, and a common plate disposed in the center between the high and low-potential plates and electrically connected with the movable contact to rotate slidingly on the high and low-potential plates together with an output shaft of the wiper motor.

3 Claims, 11 Drawing Sheets

WIPER MOTOR

BACKGROUND OF THE INVENTION

1. Field of the Invention

This invention relates to a wiper motor for driving a wiper apparatus in order to wiper rain drops, dust and the like adhering to the windshield of, for example, a motor vehicle, and especially to an improved wiper motor suitable to drive a wiper apparatus which is so designed as to reverse the rotational direction of the wiper motor in response to a changeover in the rotational speed of the wiper motor, and decrease length of a motor arm of the wiper linkage at the time of high speed rotation as compared with the length at the time of low speed rotation of the wiper motor through an arm length adjusting device including an eccentric mechanism attached to the motor arm of the wiper linkage in order to solve a difference in the wiping range by the wiper blade between the time of high speed operation and low speed operation of the wiper blade caused by a difference in the inertial force of the wiper blade.

2. Description of the Prior Art

As a device for wiping rain drops adhering to the windshield of the motor vehicle or so, and ensuring the wide visual range of the driver, wiper apparatuses with various structure and function have been used. Recently, a wiper apparatus which is designed so as to be possible to switch over the operation speed of the wiper blade to continuous actuation in high and low two-level or intermittent actuation at a low speed according to the amount of rain-fall is used generally.

In the wiper apparatus of this kind, kinetic energy of the wiper blade at the time of high speed operation becomes larger than that of the wiper blade at the time of low speed operation, therefore a phenomenon is observed in that the wiping range of the wiper blade at the time of high speed operation becomes wider as compared with the wipeing range at the time of low speed operation of the wiper blade according to the difference in the inertial force of the wiper blade. Accordingly, there is defectiveness in that the windshield partially remains unwiped and the visual field becomes narrow at the time of low speed operation in a case where the wiping range of the windshield is set on basis of the oscillation range of the wiper blade at the time of high speed operation, and the moulding of the windshield flame interferes with the wiper blade at the time of high speed operation in a case where the wiping, range of the windshield is set on basis of the oscillation range of the wiper blade at the time of low speed operation.

Applicant proposed previously a wiper linkage which was so designed as to solve the difference in the actual wiping range enlarged owing to the inertial force of the wiper blade by setting the rotational direction of the wiper motor reversely at the time of high speed operation against the rotational direction at the time of low speed operation, making the substantial length of the motor arm of the wiper linkage at the time of high speed operation shorter than that of the motor arm at the time of low speed operation through an arm length adjusting mechanism attached to the motor arm and used with an eccentric bush to be turned as much as 180° at the time of switching the rotational direction of the motor arm and reducing the structural wiping range of the wiper blade at the time of high speed operation as compared with that of the wiper blade at the time of low speed operation in Japanese Patent Application No. 10-158026/98 in order to solve the difference in the wiping range caused by the difference in the operation speed of the wiper blade in such the conventional wiper apparatus.

In the newly proposed wiper linkage as mentioned above, it is different from the conventional wiper linkage fundamentally in the point that the rotational directions of the wiper motor in the high-speed mode and the low-speed mode are different from each other, therefore it becomes necessary to control the wiper motor in a manner different from the conventional wiper apparatus in changeover control of the mode, auto-stop control at the time of stopping the wiper device and so.

In such the control, although it is necessary to perform the control by referring to the present position of the wiper blade, that is a position signal generated from a position switch disposed in the wiper motor, there is a problem in that it is not always possible to obtain a position signal suitable to control the aforementioned wiper linkage by the construction of the position switch provided in the conventional wiper motor. Accordingly, development of the wiper motor provided with a position switch having conductive plates arranged suitably to generate the position signal for controlling the aforementioned wiper linkage has become an subject in the wiper device including the wiper linkage which is designed so as to solve the difference in the wiping range caused by the difference in the operation speed of the wiper blade by making the rotational direction of the wiper motor at the high speed operation different from that at the low speed operation.

SUMMARY OF THE INVENTION

This invention is made in view of the aforementioned problem in the conventional wiper motor for driving the aforementioned wiper linkage in which rotational directions of the wiper motor are different between the high-speed mode and the low-speed mode, and it is an object to provide a wiper motor provided with a position switch which generates a position signal changing in response to arrival of the wiper blade at the lower turning position and the upper turning position, is possible to automatically stop the wiper blade at the home position (lower turning position) in accordance with an off-operation of the wiper switch, and possible to change the rotational direction together with the rotational speed smoothly and speedily in response to a changeover operation of the wiper mode thereby enabling the control to solve a strange impression raised along with the reversal of the wiper motor.

In order to accomplish the aforementioned object, the wiper motor according to this invention is especially provided with position-detecting conductive plates as a position switch which are composed of a semi-ringshaped high-potential conductive plate connected to a power source, a semi-ringshaped low-potential plate grounded and disposed oppositely to the high-potential plate, and a common plate disposed in a center part between the high and low-potential plates and electrically connected to a movable contact to rotate in a state of being in contact with the high or low-potential plate according to movement of the wiper blade. The signal change is detected in the position signal from the common plate at the time when the wiper blade arrives in the lower turning position and the upper turning position or positions just before these turning positions by setting, for example, two openings existing between the high-potential plate and the low-potential plate in correspondence to the lower turning position and the upper turning position of the wiper blade, respectively. Accordingly, by stopping or reversing the rotation of the wiper motor in response to the signal change in the position signal generated from the common plate (position switch), the wiper blade stops automatically and accurately at the lower turning position (home position), and the rotational direction and speed of the wiper motor are change over at the time of arrival at the lower turning position or the upper tuning position of the wiper blade, whereby the wiper mode is changed speedily in response to the wiper switch operation as compared with a case the wiper mode is changed only when the wiper blade is in the lower turning position. Furthermore, it is solved improper behavior such that the wiper blade changes the direction at halfway in the wiping range of the wind shield.

In the wiper motor according to a preferred embodiment of this invention of which common plate is provided with a connecting plate portion extended through one of two openings formed between the high and low-potential plates, the three conductive plates forming the position switch, the high-potential plate, the low-potential plate and the common plate are disposed on the same plane, therefore the position switch is simplified in construction. In the wiper motor according to another preferred embodiment of this invention, a first opening of the aforementioned two openings corresponds to the lower turning position of the wiper blade, a second opening of the two openings corresponds to the upper turning position of the wiper blade and the connecting plate portion of the common plate is extended through the second opening, therefore the wiper blade stops at the lower turning position automatically and more accurately by making the first opening narrower than the second opening.

DESCRIPTION OF PREFERRED EMBODIMENT

This invention will be explained below more concretely on basis of FIG. 1 to FIG. 13.

Figure 1:
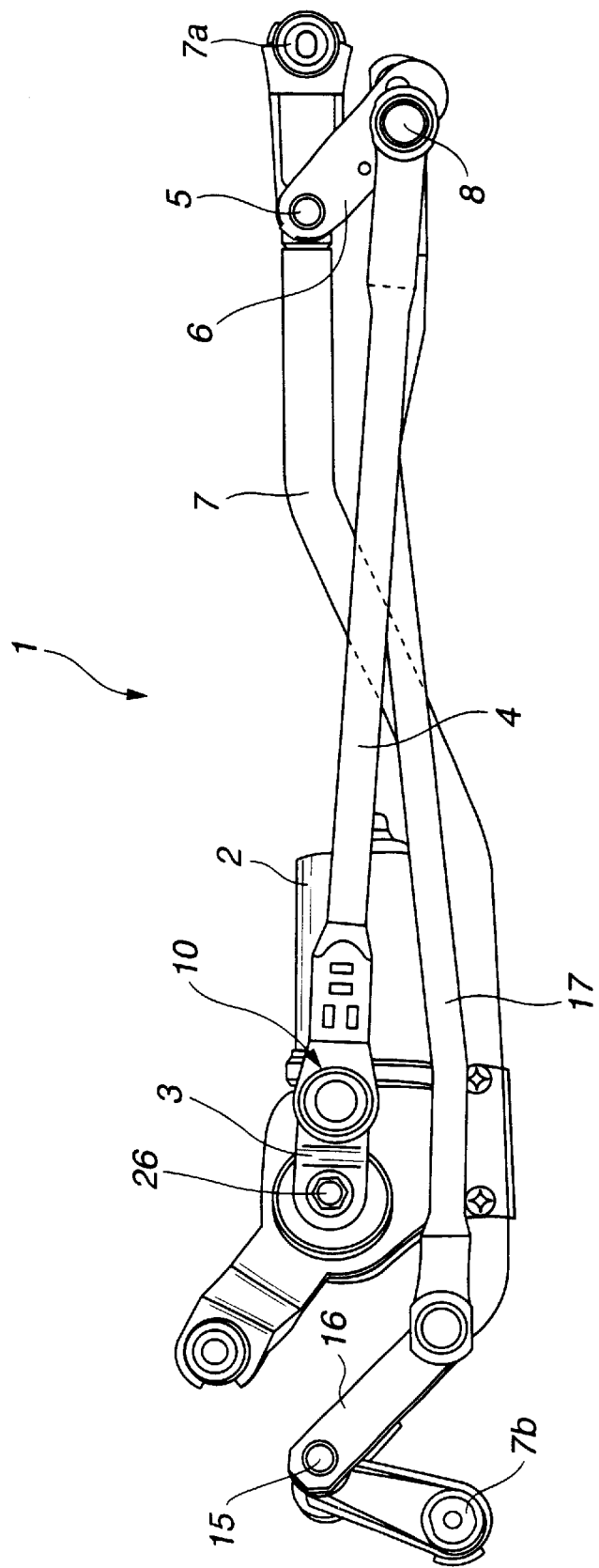
FIG. 1 is a front view illustrating the structure of a wiper linkage to be connected with the wiper motor according to this invention.
Figure 2:
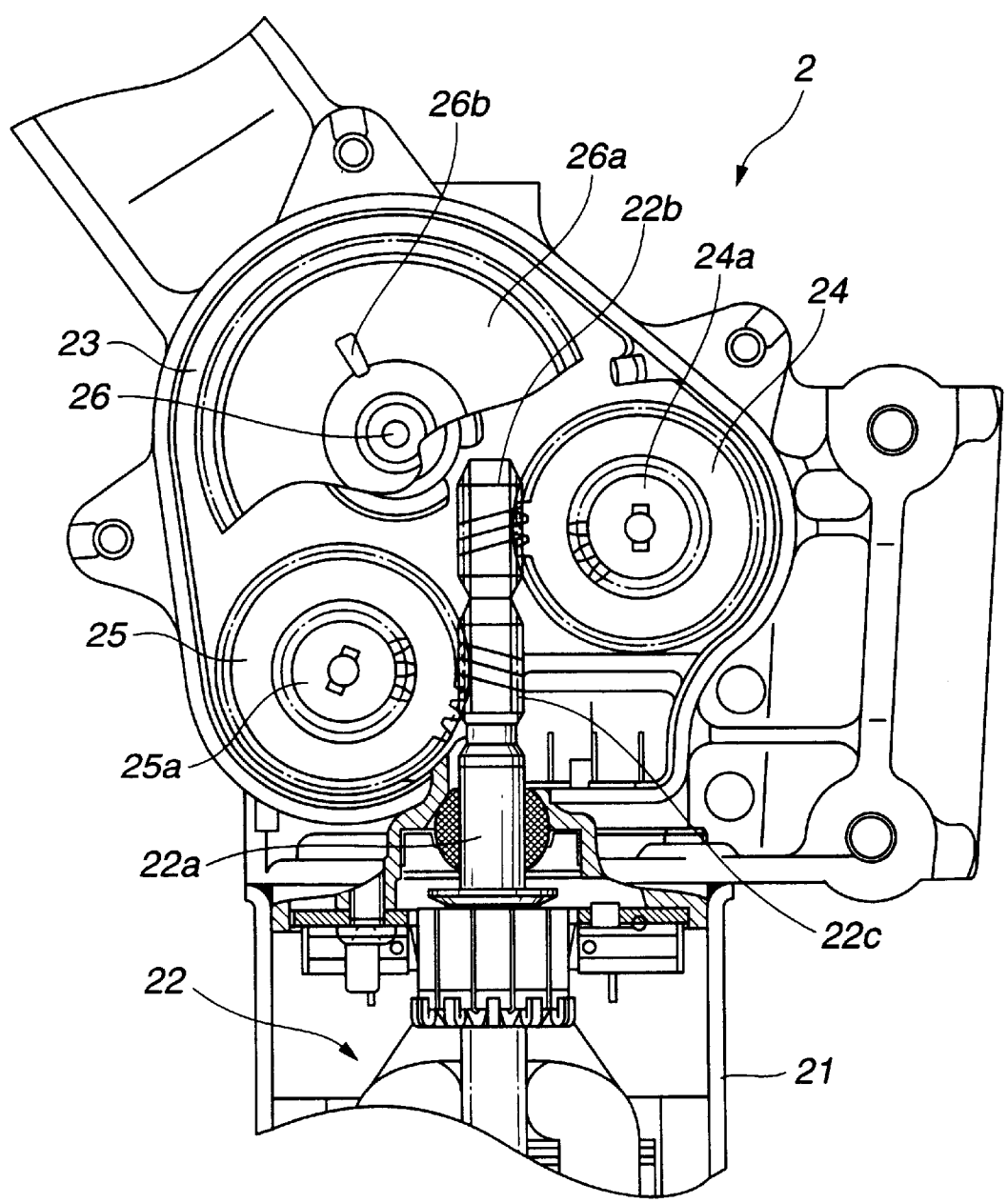
FIG. 2 is a partially cutaway view illustrating the internal structure of the wiper motor according to an embodiment of this invention.

FIGS. 1 to 13 are drawings for explaining a wiper apparatus provided with a wiper motor according to this invention, FIG. 1 is a front view showing external appearance of the wiper linkage operable connected with the wiper motor of this invention and FIGS. 2 and 3 are explanatory drawings showing inside construction of the wiper motor according to this invention.

The wiper linkage 1 shown in FIG. 1 is mainly composed of a motor arm 3 secured to an output shaft 26 of the wiper motor 2 according to this invention and described later in detail at the base end thereof, a link connecting rod 4, a pivot shaft 5, a pivot arm 6 and wiper frame 7, and the wiper motor 2 is fixed on the wiper frame 7.

The wiper motor 2 is a two-speed DC motor provided with three brush (common brush, low brush and high brush), and further provided with an armature 22 supported rotatably in a motor case 21 as shown in FIG. 2. The armature 22 is provided with an armature shaft 22a of which top end protrudes into a gear case 23 connected with the motor case 21, the armature shaft 22a is formed with two worms 22b and 22c having respective lead angles in the opposite direction from each other, and two worm wheel 24 and 25 are meshed with the one pair of worms 22b and 22c.

These worm wheels 24 and 25 are coaxially fixed with respective counter gears 24a and 25a, which are rotated together with the worm wheels 24 and 25. An output gear 26a secured with the output shaft 26 protruding out of the gear case 23 is rotated by meshing with the both counter gears 24a and 25a, accordingly the output shaft 26 and the motor arm 3 secured to the output shaft 26 are so structured as to rotate forwardly (clockwise rotation) in a low speed at the low-speed mode and to rotate reversely (counter-clockwise rotation) in a high speed at the high-speed mode according to the power supply through external wiring (not shown).

In the wiper motor 2, which is so designed as to rotate by engaging the two worm wheels 24 and 25 with one pair of worms 22b and 22c having lead angles in the opposite direction with each other, therefore the direction of the first thrust loading caused by the first combination of the worm and worm wheel and the second thrust loading caused by the second combination of them are contrary to each other, and the first and second thrust loading are cancelled. Therefore, it becomes unnecessary to provide thrust bearings in the motor, it is possible to solve chattering caused by reversing the motor, and switching of the rotational direction can be performed very smoothly.

Figure 3A:
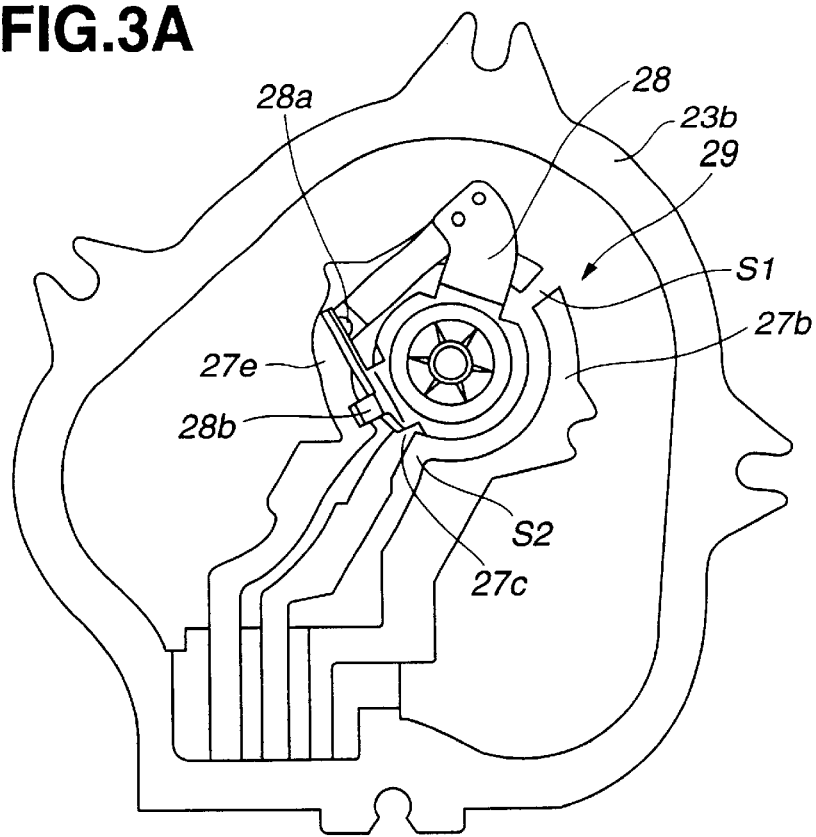
FIG. 3A is a plan view illustrating the shape of the position switch disposed in a gear cover of the wiper motor shown in FIG. 2.
Figure 3B:
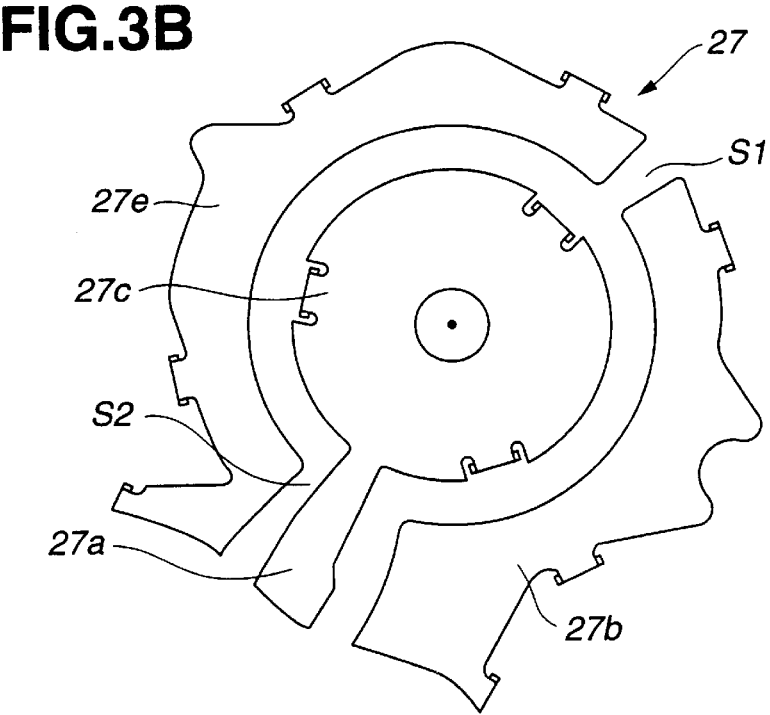
FIG. 3B is a plan view illustrating the shape of the position-detecting conductive plates forming the position switch.

The structure of a gear case cover 23b to be fitted on the gear case 23 of the wiper motor, 2 is shown in FIG. 3A, and the gear case cover 23b is formed with resin material and fixed with position-detecting conductive plates 27 shown in FIG. 3B by pressing.

The position-detecting conductive plates 27 are composed of a high-potential plate 27b formed in a semi-ringshape from electrically conductive material, a low-potential plate 27e formed similarly in a semi-ringshape from electrically conductive material and disposed oppositely to the high-potential plate 27b, and a common plate 27c disposed in the center part between the high-potential plate 27b and the low-potential plate 27e, and the common plate 27c formed in a round shape similarly from electrically conductive material is surrounded annularly by the high-potential plate 27b and the low-potential plate 27e. Furthermore, a first opening S1 and a second opening S2 are formed between high and low-potential plates 27b and 27e, and a connecting plate portion 27e extended from the common plate 27c is taken out through the second opening S2 having the width broader than that of the first opening S1 as shown in FIG. 3B.

The position-detecting conductive plates 27 are fixed to the gear case cover 23b by pressing so as to coincide the center of the round shaped common plate 27c with the central axis of the output shaft 26. The common plate 27c is attached rotatably with a clutch member 28 having a movable contact 28a at the center thereof and the movable contact 28a of the clutch member 28 is so structured as to slide on the high-potential plate 27b and the low-potential plate 27e as being in contact with them according to the rotation of the clutch member 28. Namely, a position switch 29 is formed by the position-detecting conductive plates 27 (27b, 27e and 27c) and the clutch member 28 including the movable contact 28a, a position signal on a high-level is supplied to a position signal monitoring port of a controller (described later) through the connecting plate portion 27a of the common plate 27c when the movable contact 28a of the clutch member 28 is in contact with the high-potential plate 27b connected with a power source and a position signal on a low-level is supplied to the position signal monitoring port through the connecting plate portion 27a when the movable contact 28a is in contact with the low potential plate 27e which is grounded.

The clutch member 28 is further provided with an engaging lug 28b and so designed as to rotate together with the output shaft 26 of the wiper motor 2 according to the contact of the engaging lug 28b with an engaging projection 26b provided to the output gear 26a of the output shaft 26 in the direction orientated by the output shaft 26. Accordingly, when the rotational direction of the wiper motor 2 is changed, the clutch member 28 is left behind in the position at the time of starting the change of the rotational direction together with the movable contact 28a until the engaging projection 26b of the output shaft 26 comes contact with the engaging lug 28b of the clutch member 28 on the opposite side after nearly one revolution of the output shaft 26.

The wiper arm 3 of the wiper linkage 1 is fixed to the output shaft 26 of the wiper motor 2 by a nut on the base end side thereof as shown in FIG. 1, and connected rotatably to one end of the link connecting rod 4 through an eccentric mechanism 10 (described later) on the top end (free end) side thereof.

The pivot shaft 5 is supported rotatably at the wiper frame 7, is fixed with the base end side of the pivot arm 6 on the front side of the drawing and designed so as to be screwed with a wiper arm attached with a wiper blade at the top end protruding outward of the vehicle body on the back side of the drawing. Further, the top end (free end) of the pivot arm 6 is connected rotatably to the other end of the link connecting rod 4 through a ball joint 8, whereby the rotation of the wiper motor 2 is converted into the reciprocative turn of the pivot shaft 5 and the reciprocative oscillation of the wiper blade through these links.

Furthermore, the wiper linkage 1 in this embodiment is provided with another set of a pivot shaft 15, a pivot arm 16 and a link connecting rod 17 and so designed as to drive another wiper blade attached to the top end of the second pivot shaft 15 at the same time by connecting both ends of the second link connecting rod 17 to the respective top ends of the pivot arms 6 and 16 through ball joints.

On the other side, the first opening S1 and the second opening S2 existing between the high-potential plate 27b and the low-potential plate 27e of the aforementioned position switch 29 are set in correspondence to the lower turning position (home position) and the upper turning position of the wiper blade, respectively, and disposed so that the movable contact 28a of the position switch 29 may come contact with the first opening S1 and the second opening S2 at the time when the wiper blade arrives to the lower turning position and the upper turning position, respectively.

Figure 4A:
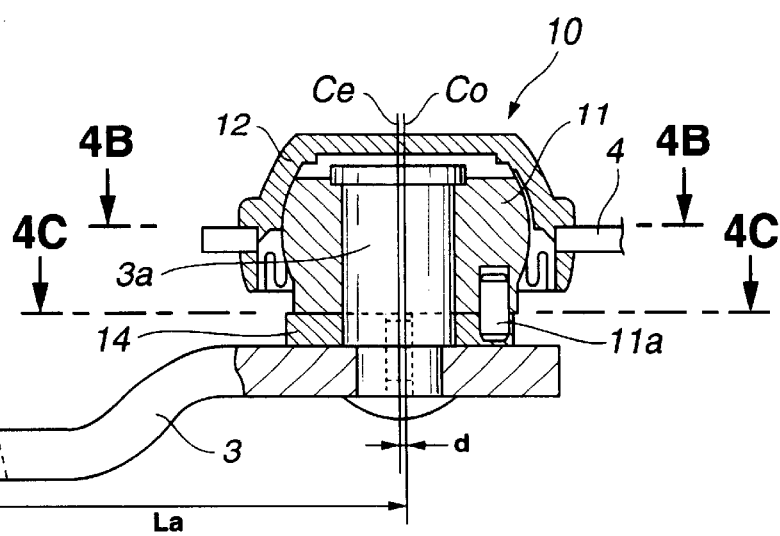
FIG. 4A is a vertical sectional view illustrating the structure of an eccentric mechanism in the wiper linkage shown in FIG. 1.
Figure 4B:
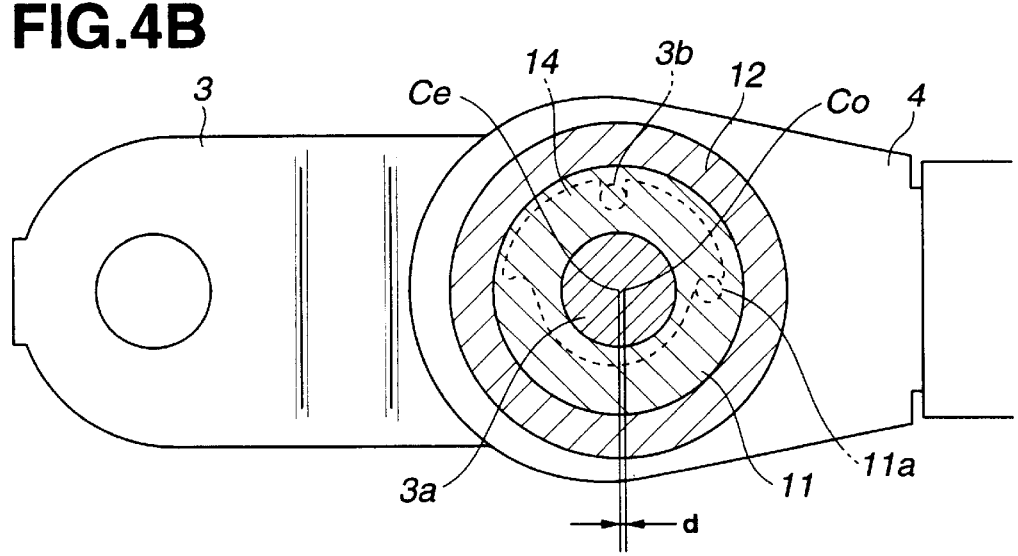
FIG. 4B is a horizontal sectional view along section lines 4B—4B of FIG. 4A.
Figure 4C:
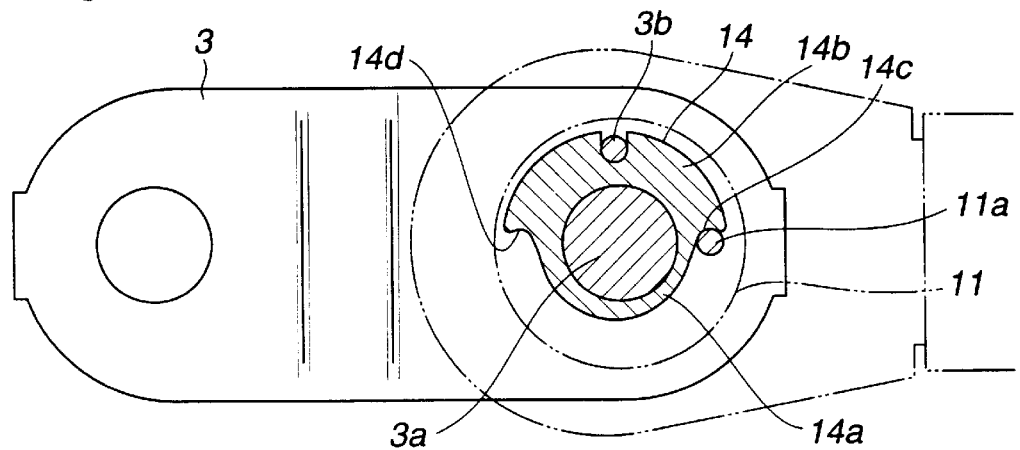
FIG. 4C is a horizontal sectional view along section lines 4C—4C of FIG. 4A.

The eccentric mechanism 10 is mainly composed of an eccentric bush 11 having a rotation axis Ce off-centered from the center axis Co as much as a predetermined distance "d" and supported rotatably by an axle 3a provided on the motor arm 3 in parallel to the output shaft 26 of the wiper motor 2 at the rotation axis Ce, a retainer 12 fitted rotatably on the outer periphery of the eccentric bush 11 and fixed to the one end of the link connecting rod 4, and an engaging plate 14 fitted on the axle 3a of the motor arm 3 and fixed so as not to rotate about the axle 3a by a protrusion 3b formed on the motor arm 3 in one body as shown in FIGS. 4A to 4C.

The engaging plate 14 is provided with a ringshaped fitting portion 14a to be fitted on the axle 3a and a fan-shaped rotation-prohibiting portion 14b to come contact with an engaging pin 11a press-inserted in the lower face on the outer peripheral side of the eccentric bush 11, and attached so as not to rotate on the motor arm 3 as mentioned above.

Therefore, the eccentric bush 11 is possible to turn about the axle 3a as much as 180° between the position where the engaging pin 11a of the eccentric bush 11 comes contact with one end 14c of the rotation-prohibiting portion 14b of the engaging plate 14 and the position where the engaging pin 11a comes contact with another end 14d of the rotation-prohibiting portion 14b, and the substantial length of the motor arm 3 becomes longer into La (=L+d, L: distance between the center axes of the output shaft 26 and the axle 3a, d: distance of eccentricity in the eccentric bush 11) in the state where the engaging pin 11a of the eccentric bush 11 is in contact with the one end 14c of the rotation prohibiting-portion 14b because the center axis Co of the eccentric bush 11 is situated in the position near to the top end of the motor arm 3 as compared with the rotation axis Ce as shown in FIGS. 4A to 4C. Contrary to this, the substantial length of the motor arm 3 becomes shorter into Lb (=L−d) in the state where the engaging pin 11a is in contact with the other end 14d of the rotation-prohibiting portion 14b of the engaging plate 14 because the center axis Co of the eccentric bush 11 is located in the position near to the base end of the motor arm 3 as compared with the rotation axis Ce.

The wiper linkage 1 having the aforementioned construction is fixed to the body panel of the motor vehicle at the both end portions 7a and 7b of the wiper frame 7, and the wiper arms furnished with the wiper blades 18 (see FIG. 11) are screwed to the pivot shafts 5 and 15 protruding outward of the vehicle body, respectively.

Figure 5:
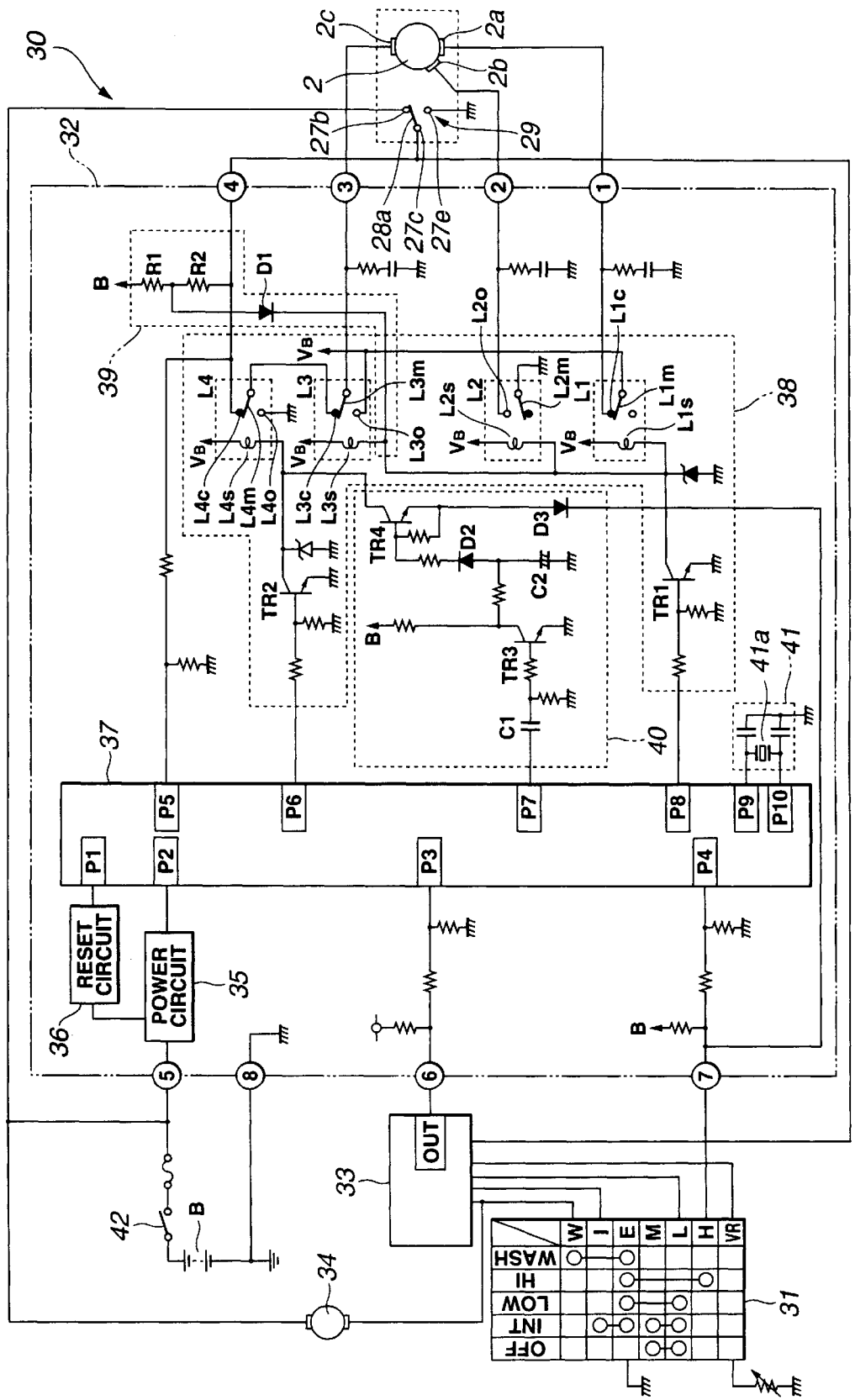
FIG. 5 is a circuit diagram of a control device for controlling the wiper motor shown in FIGS. 2 and 4.

FIG. 5 is a circuit diagram illustrating the circuit configuration of a wiper control device for controlling the wiper apparatus provided with the aforementioned wiper linkage 1 and wiper motor 2, the wiper control device 30 shown in the drawing is mainly composed of a wiper switch 31, a control unit 32, a pulse generator 83 and a washer motor 34, and the control unit 32 includes a power circuit 35, a reset circuit 36 a controller 37, a motor driving circuit 38, an opening-regulating circuit 39, a backup circuit 40 and an oscillating circuit 41, and is connected with the wiper motor 2 having the position switch 29 as described above.

The wiper switch 31 is designed so as to be possible to select the operation mode of the wiper apparatus among a stop mode (OFF), an intermittent mode (INT), a low-speed mode (LOW), a high-speed mode (HI) and a wash mode (WASH), H-terminal of the wiper switch 31 is connected to a high-speed command signal input port P4 of the controller 37 through No. 7 terminal of the control unit 32 and L-terminal, I-terminal and W-terminal of the wiper switch 31 are connected to a low-speed command signal input terminal P3 of the controller 37 through the pulse generator 33 and No.6 terminal of the control unit 32. When the wiper switch 31 is operated into the high-speed mode (HI), the No. 7 terminal of the control unit 32 is grounded through the H-terminal and E-terminal of the wiper switch 31 and a low-level signal is fed as a high-speed command signal into the high-speed command signal input port P4 of the controller 37, whereby the selection of the high-speed mode is recognized by the controller 37.

If the wiper switch 31 is operated into the low-speed mode (LOW), the No. 6 terminal of the control unit 32 is grounded through the pulse generator 33 (non-actuation), the L-terminal and the E-terminal of the wiper switch 31 and a low-level signal is fed as a low-speed command signal into the low-speed command signal input port P3 of the controller 37, whereby the selection of the low-speed mode is recognized by the controller 37.

Furthermore, when the wiper switch 31 is operated into the intermittent mode (INT), the NO. 6 terminal of the control unit 32 is grounded intermittently through the pulse generator 33 (actuation), the L-terminal and the E-terminal of the wiper switch 31, whereby the wiper motor 2 is operated intermittently at a low speed. If the wiper switch 31 is operated into the wash mode (WASH), the W-terminal of the wiper switch 31 is grounded through the E-terminal, whereby the washer motor 34 starts the rotation and a cleansing liquid is sprayed against the windshield glass.

The wiper motor 2 is provided with a first terminal 2c connected with the common brush, a second terminal 2a connected with the low brush and a third terminal 2b connected with the high brush, the first terminal 2c of the wiper motor 2 is connected to a moving contact L3m of a third relay L3 in the motor driving circuit 38 (described later) through NO. 3 terminal of the control unit 32, the second terminal 2a of the motor 2 is connected to a normal-closed contact L1c of a first relay L1 in the motor driving circuit 38 through No. 1 terminal of the control unit 32, and the third terminal 2b of the motor 2 is connected to a normal-opened contact L2o of a second relay L2 in the motor driving circuit 38 through No. 2 terminal of the control unit 32. The wiper motor 2 is so designed as to rotate in the forward direction at a low speed according to an electric current flowing to the first terminal 2c from the second terminal 2a and as to rotate in the reverse direction at a high speed according to an electric current flowing to the third terminal 2b from the first terminal 2c.

In the position switch 29 housed in the wiper motor 2, the high-potential plate 27b is connected to a power source B, the low-potential plate 27e is grounded, and the movable contact 28a, which slides on the high-potential plate 27b and the low-potential plate 27e according to the position of the output shaft 26 of the motor 2, that is the position of the wiper blade 18, is connected to a position signal monitoring port P5 of the controller 37 and a normal-closed contact L4c of a fourth relay L4 in the motor driving circuit 38 through the common plate 27c and No. 4 terminal of the control unit 32. Accordingly, a high-level signal is supplied to the position signal monitoring port P5 of the controller 37 as a position signal when the movable contact 28a is on the high-potential plate 27b, and a low-level signal is supplied to the position signal monitoring port P5 as the position signal when the movable contact 28a is on the low-potential plate 27e.

The power circuit 35 in the control unit 32 is a constant voltage circuit connected between No. 5 terminal connected to the power source B through an ignition switch 42 and a power port P2 of the controller 37 and has a function to supply constant voltage to the controller by on-operation of the ignition switch 42.

The reset circuit 36 is a delay circuit connected between the power circuit 35 and a reset port P1 of the controller 37 and has a function to reset the controller 37, which is a microcomputer into the initial state by grounding the reset port P1 for a predetermined time after the on-operation of the ignition switch 42.

The controller 37 is a microcomputer (microprocessor) as described above, and provided with a low-speed driving signal output port P6 for generating a low-speed driving signal in response to the low-speed command signal supplied from the wiper switch 31 through the low-speed command signal input port P3 and the position signal supplied from the position switch 29 through the position signal monitoring port P5, a watchdog signal output port P7 for generating a watchdog signal, a high-speed driving signal output port P8 for generating a high-speed driving signal in response to the high-speed command signal supplied from the wiper switch 31 through the high-speed command signal input port P4 and the position signal supplied through the position signal monitoring port P5, and oscillation ports P9 and P10 to be connected with the oscillating circuit 41 in addition to the aforementioned reset port P1, power port P2, low-speed command signal input port P3, high-speed command signal input port P4 and position signal monitoring port P5. The motor driving circuit 38 is mainly composed of four relays L1, L2, L3 and L4, transistors TR1 and TR2, each of one end of relay coils L1s, L2s and L3s of the first relay L1, the second relay L2 and the third relay L3 is connected to the power source side, and each of another end of these relay coils is connected to the collector of the first transistor TR1 of which emitter is grounded and of which base is connected to the high-speed driving signal output port P8 of the controller 37. A moving contact L1m of the first relay L1 is connected to the power source side together with a normal-opened contact L3o of the third relay L3, and the normal-closed contact L1c of the first relay L1 is connected to the second terminal (low brush) 2a of the wiper motor 2 through the No. 1 terminal of the control unit 32 as mentioned above. Furthermore, a moving contact L2m of the second relay L2 is grounded, and the normal-opened contact L2o of the second relay L2 is connected to the third terminal (high brush) 2b of the wiper motor 2 through the No. 2 terminal. The moving contact L3m of the third relay L3 is connected to the first terminal (common brush) 2c of the wiper motor 2 through the No. 3 terminal, and a normal-closed contact L3c of the third relay L3 is connected to a moving contact L4m of the fourth relay L4.

One end of a relay coil L4s of the fourth relay L4 is similarly connected to the power source side and another end of the relay coil L4s is connected to the collector of the second transistor TR2 of which emitter is grounded and of which base is connected to the low-speed driving signal output port P6 of the controller 37. Further, a normal-opened contact L4o of the fourth relay L4 is grounded, the normal-closed contact L4c of the fourth relay L4 is connected to the first terminal 2c of the wiper motor 2 through the No. 3 terminal of the control unit 32 and the moving contact L4m is connected to the normal-closed contact L3c of the third relay L3 as described above.

The opening-regulating circuit 39 is composed of two resistors R1 and R2, and a diode D1, has a function to regulate the source voltage through the resistors R1, R2 and apply the regulated voltage to the connection wire between the position signal monitoring port P5 of the controller 37 and the movable contact 28a of the position switch 29, and the node between the resistors R1 and R2 is connected to the collector of the first transistor TR1 through the diode D1.

When the high-speed driving signal is not generated from the high-speed driving signal output port P8 of the controller 37, the first transistor TR1 is in the off-state, so that a high-level signal regulated through the resistors R1, R2 of the opening-regulating circuit 39 is supplied to the position signal monitoring port P5 of the controller even if the movable contact 28a of the position switch 29 separates from the high-potential plate 27b and is on the opening S1 or S2 between the both plates 27b and 27e. The other side, when the high-speed driving signal is generated from the high-speed driving signal output port P8, the transistor TR1 becomes to the on-state and the node between the resistors R1 and R2 is grounded through the diode D1 and the transistor TR1, accordingly the position signal to be supplied into the position signal monitoring port P5 changes into a low-level at the same time of separating the movable contact 28a of the position switch 29 from the high-position plate 27b.

The backup circuit 40 is mainly composed of two transistors TR3, TR4, capacitors C1, C2 and diodes D2, D3, the base of the transistor TR3 is connected to the watchdog signal output port P7 of the controller 37 through the capacitor C1, the emitter is grounded and the collector of the transistor TR3 is connected to the power source B and the base of the transistor TR4 through a resistor and the diode D2. The collector of the transistor TR4 is connected to another end of the relay coil L4s of the fourth relay L4 in the motor driving circuit 38, the emitter of the transistor TR4 is connected to the No. 7 terminal of the control unit 32 through the diode D3 and the No. 7 terminal is connected to the H-terminal of the wiper switch 31 as mentioned above.

Figure 6:
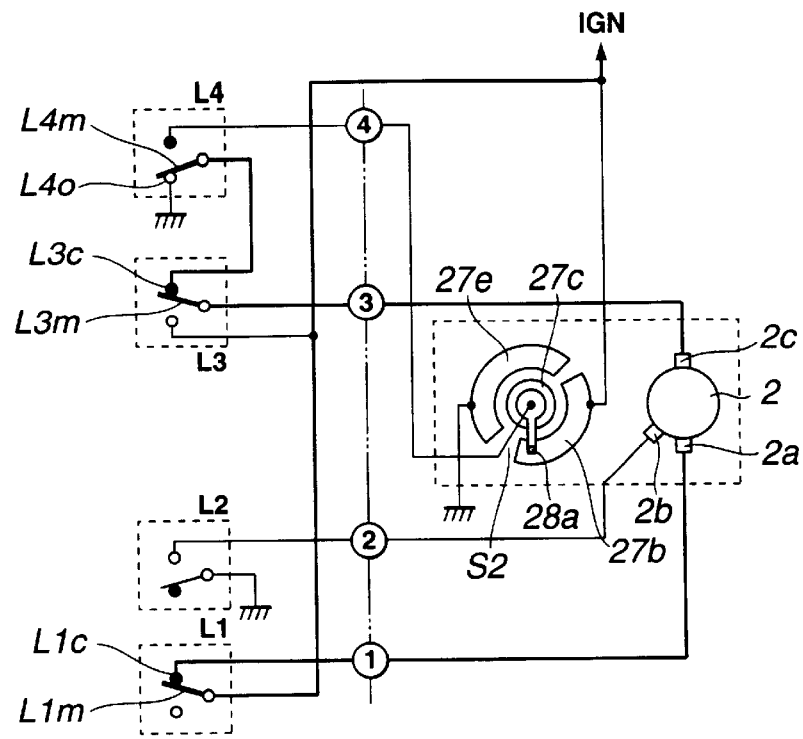
FIG. 6 is a circuit diagram illustrating power supply to the wiper motor at the time of low speed operation by a motor driving circuit shown in FIG. 5.

In the backup circuit 40, the capacitor C1 is charged, the transistor TR3 is switched on and the transistor TR4 is in the off-state so long as the watchdog signal is normally generated from the watchdog signal output port P7 of the controller 37, however if the output of the watchdog signal is interrupted by some failure, the capacitor C1 is discharged and the transistor TR3 is switched off, so that high potential voltage is applied to the base of the transistor TR4 according to charging of the capacitor C2. By operating the wiper switch 31 into the high-speed mode (HI) in this time, the relay coil L4s of the fourth relay L4 is grounded through the transistor TR4, the diode D3 and the H-terminal and the E-terminal of the wiper switch 31, so that the fourth relay L4 is switched on and the wiper motor 2 is supplied with an electric current in the direction for low-speed forward rotation as shown in FIG. 6 (described later), whereby the wiper blade 18 is operated in the low speed. Namely, in the wiper apparatus of this embodiment, it is possible to actuate the wiper blade in the low speed by operating the wiper switch 31 into the high-speed mode (HI) and possible to avoid a serious situation in that the wiper blade becomes impossible to be actuated in the least even if the microcomputer of the controller 37 breaks down at the worst.

The oscillating circuit 41 is composed of a clock signal generator 41a and two capacitors, connected to the oscillation ports P9 and P10 and give a clock signal for the control to the controller 37.

In the wiper apparatus provided with the aforementioned wiper linkage 1, the wiper motor 2 and the wiper control device 30, when the wiper switch 31 is operated into the low-speed side (LOW) from the off-state, the low-speed command signal input port P3 of the controller 37 is grounded through the wiper switch 31, whereby the controller 37 recognizes that the low-speed switch in the wiper switch 31 is switched on and generates the high-level signal (low-speed driving signal) from the low-speed driving signal output port P6.

The transistor TR2 in the motor driving circuit 38 becomes to the on-state according to the output signal from the low-speed driving signal output port P6, the relay coil L4s of the relay L4 is excited and only this fourth relay L4 is changed on as shown in FIG. 6. Accordingly, a feeder circuit is formed, which connects the power source B and the second terminal 2a (low brush) of the wiper motor 2 through the normal-closed contact L1c of the first relay L1 and grounds the first terminal 2c of the wiper motor 2 through the normal-closed contact L3c of the third relay L3 and the normal-opened contact L4o of the fourth relay L4, whereby the wiper motor 2 starts the forward rotation in the low speed and the wiper blade 18 starts the wipeing operation in the low speed.

Figure 10A:
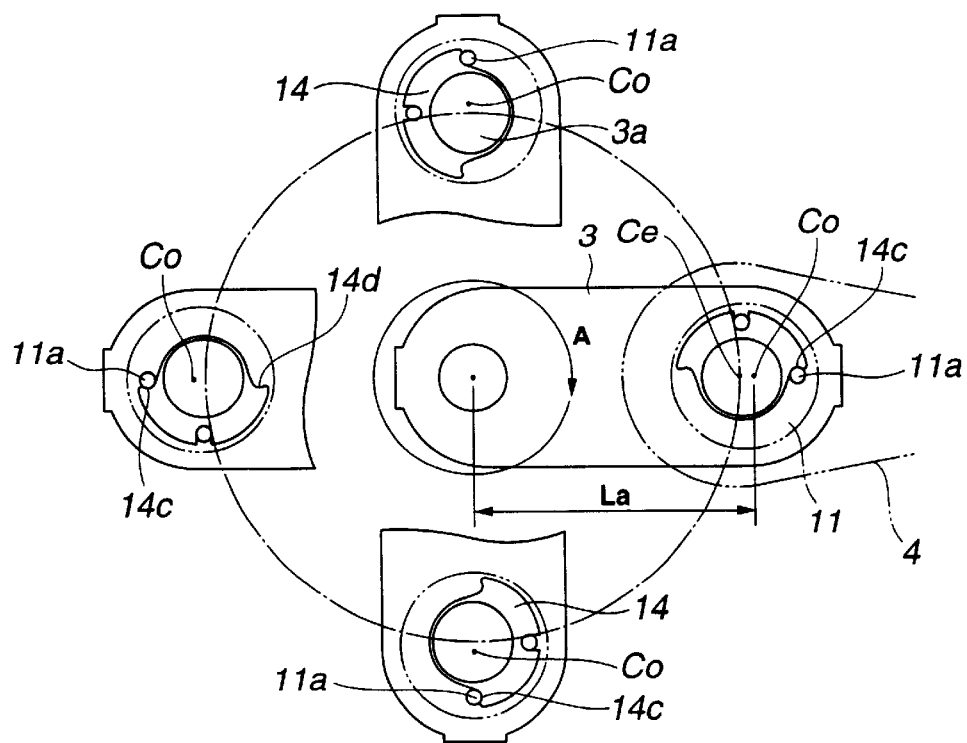
FIG. 10A is an explanatory drawing illustrating a location of an eccentric bush in the wiper linkage shown in FIG. 1 at the time of low-speed mode.
Figure 11A:
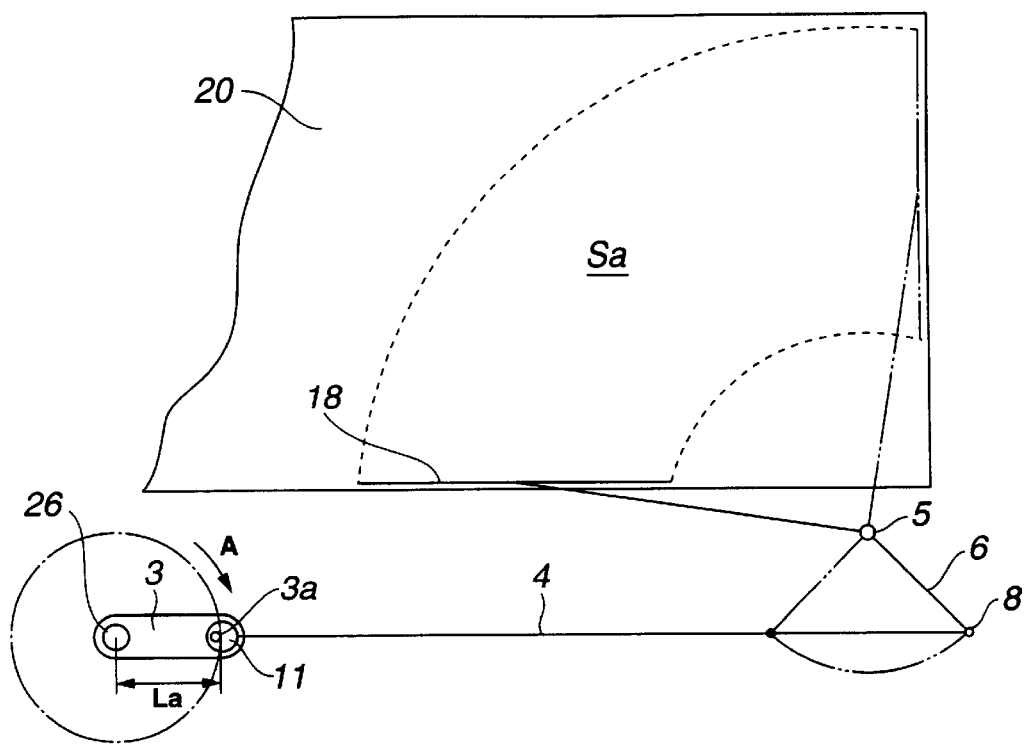
FIG. 11A is an explanatory drawing illustrating a relationship between rotational direction and length of the motor arm and structural wiping range of the wiper blade in the wiper linkage shown in FIG. 1 at the time of low-speed mode.

In this time, the substantial length of the motor arm 3 becomes longer as much as eccentricity of "d", that is La (L+d) during the wiper motor 2 is running at the low speed in the forward direction and the motor arm 3 is rotating forwardly in the direction of the arrow A as shown in FIG. 10A, because the engaging pin 11a of the eccentric bush 11 is in contact with the one end 14c of the rotation prohibition portion 14b of the engaging plate 14 in the eccentric mechanism 10 and the eccentric bush 11 is maintained in the position where the center axis Co of the eccentric bush 11 is situated more closely to the top end of the motor arm 3 as compared with the rotation axis Ce. Accordingly, the wiper blade 18 attached to the pivot shaft 5 of the wiper linkage 1 through the wiper arm is actuated swingingly on the windshield glass 20 in the wiping range Sa as shown in FIG. 11A.

When the wiper switch 31 is switched off in a state where the wiper blade 18 is actuated in the low speed (low-speed mode), the controller 37 recognizes the off-operation of the wiper switch 31 according to disappearance of the low-speed command signal from the wiper switch 31 (the low-speed command input port P3 of the controller 37 is not grounded), but maintains the output of the low-speed driving signal from the L low-speed driving signal output port P6 and continues the low-speed forward rotation of the wiper motor 2 during the movable contact 28a is on the high-potential plate 27b of the position switch 29 and the position signal is the high-level, that is during the wiper blade 18 is moving toward the upper turning position from the lower turning position by referring to the position signal supplied to the position signal monitoring port P5 from the position switch 29.

Figure 7:
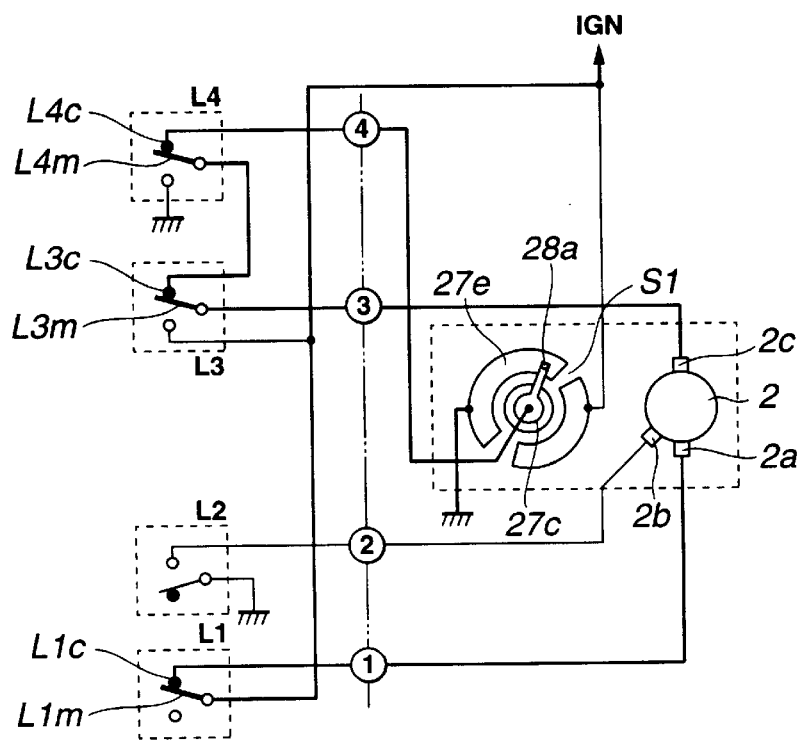
FIG. 7 is a circuit diagram illustrating power supply to the wiper-motor at the time of automatic stop operation by the motor driving circuit shown in FIG. 5.
Figure 8:
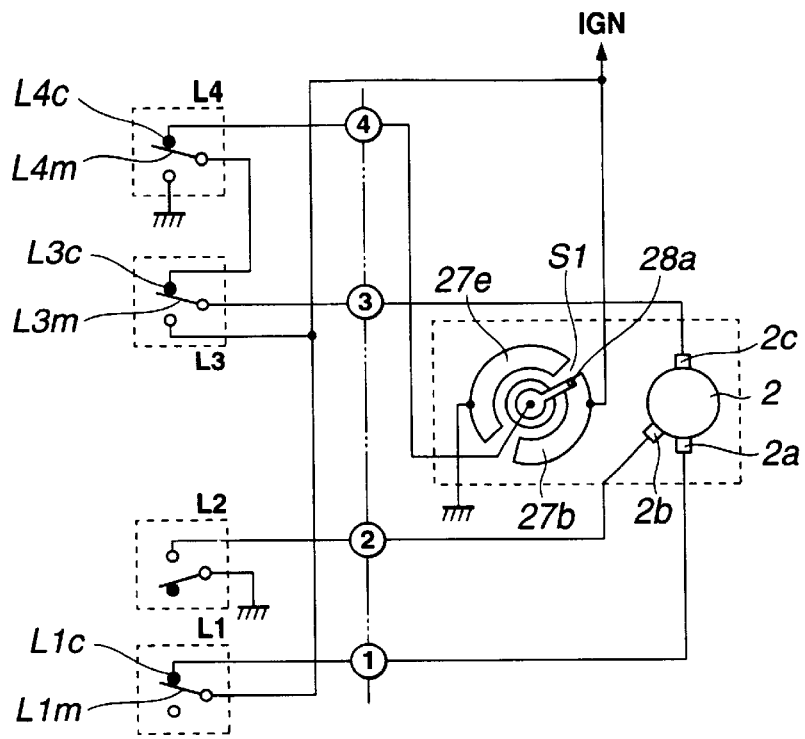
FIG. 8 is a circuit diagram illustrating an armature short circuit formed by the motor driving circuit shown in FIG. 5.

When the wiper blade 18 passes the upper turning position and the movable contact 28a (which is moving in the clockwise direction in FIG. 6 slidingly on the high-potential plate 27b and the low-potential plate 27e according to the low-speed forward rotation of the wiper motor 2) comes contact with the low-potential plate 27e after passing through the second opening S2 from the high-potential plate 27b, thereby changing the position signal into the low-level, the controller 37 interrupts the output of the low-speed driving signal. Therefore, the transistor TR2 is turned into the off-state and the relay coil L4s of the fourth relay L4 is unexcited, thereby switching off all the relays, however an auto-running circuit connecting the second terminal 2a of the wiper motor 2 to the power source B through the normal-closed contact L1c of the first relay L1 and grounding the first terminal 2c of the wiper motor 2 through the normal-closed contact L3c of the third relay 13, the normal-closed contact L4c of the fourth relay L4, the movable contact 28a and the low-potential plate 27e of the position switch 29 is formed during the movable contact 28a is in contact with the low-potential plate 27e of the position switch 29 as shown in FIG. 7, whereby the low-speed forward rotation of the wiper motor 2 is kept on. The auto-running circuit is shut off at the time when the wiper blade 18 arrives in a point just before the lower-turning position, so that the movable contact 28a of the position switch 29 separates from the low-potential plate 27e and comes contact with the first opening S1, however the wiper motor 2 is further rotated by inertia, and then an armature short circuit is formed as shown in FIG. 8 just at the time when the wiper blade 18 arrives at the lower turning position and the movable contact 28a comes in contact with the high-potential plate 27b, whereby the wiper motor 2 stops and the wiper blade 18 also stops at the lower turning position (home position).

If switching operation of the wiper switch 31 is carried out from the low-speed mode (LOW) into the high-speed mode (HI) in the state where the wiper blade 18 is actuated in the low speed (low-speed mode), the controller 37 interrupts the output signal from the low-speed driving signal output port P6 and outputs the high-speed driving signal from the high-speed driving signal output port P8 at the time when the wiper blade 18 arrives first at the upper turning position or the lower turning position after the switching operation of the wiper switch 31.

Namely, the output signal is switched over to the high-speed driving signal from the low-speed driving signal at the time when the wiper blade 18 arrives at the upper turning position and a negative going edge (H→L) is generated in the position signal supplied to the position signal monitoring port P5 by the contact of the movable contact 28a with the low-potential plate 27e of the position switch 29 through the second opening S2 in a case where the switching operation of the wiper switch 31 is carried out during the wiper blade 18 is moving toward the upper turning position from the lower turning position, or switched over to the high-speed driving signal at the time when the wiper blade 18 arrives at the lower turning position and a positive going edge (L→H) is generated in the position signal supplied to the position signal monitoring port P5 according to the contact of the movable contact 28a with the first opening S1 by separating from the low-potential plate 27e of the position switch 29 in a case where the switching operation of the wiper switch is carried out during the wiper blade 18 is moving toward the lower turning position from the upper turning position.

Figure 9:
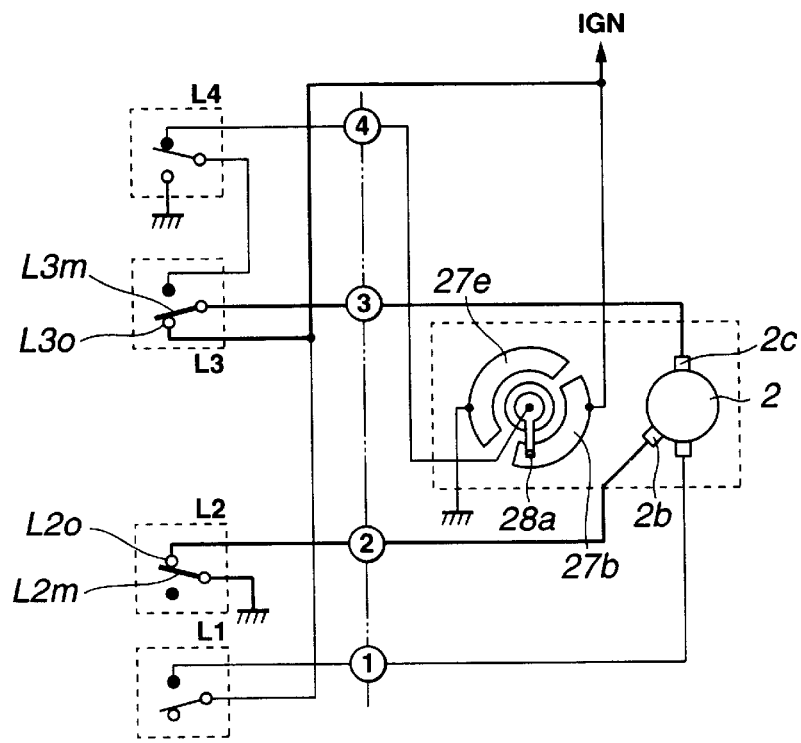
FIG. 9 is a circuit diagram illustrating power supply to the wiper motor at the time of high speed operation by the motor driving circuit shown in FIG. 5.

According to the changeover of the output signal, the transistor TR2 is changed into the off-state and the transistor TR1 is changed into the on-state, whereby the coil L4s of the fourth relay L4 is unexcited (OFF) and the coils L1s, L2s and L3s of the relays L1, L2 and L3 are excited (ON). Therefore, a feeder circuit is formed as shown in FIG. 9, which connects the first terminal 2c of the wiper motor 2 to the power source B through the normal-opened contact L3o of the third relay L3 and grounds the third terminal 2b (high brush) of the wiper motor 2 through the normal-opened contact L2o of the second relay L2, and the low-speed forward rotation of the wiper motor 2 is switched over into the high-speed reverse rotation.

Figure 12:
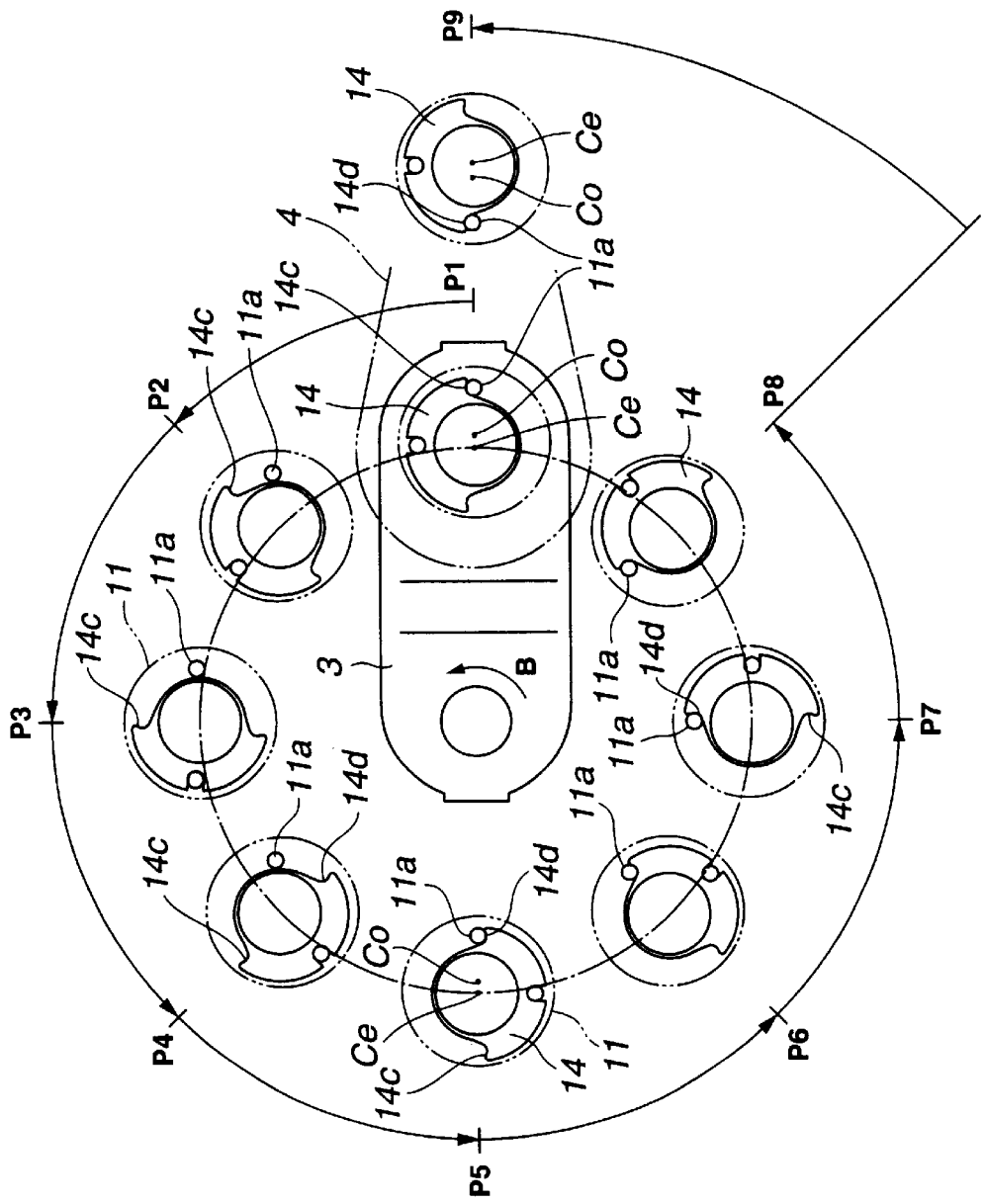
FIG. 12 is an explanatory drawing illustrating revolution of the eccentric metal at the time of switching the wiper mode into the high-speed mode from the low-speed mode by the eccentric mechanism shown in FIG. 4.

When the wiper motor 2 is switched over into the high-speed reverse rotation from the low-speed forward rotation and the motor arm 3 begins to rotate in the reverse direction, the eccentric bush 11 starts clockwise rotation against the motor arm 3 together with the retainer 12 fixed to the link connecting rod 4 by frictional force caused between the retainer 12 and the eccentric bush 11 according as the motor arm 3 moves from the position P1 to the position P2, P3 . . . P8, P9 in order and makes one revolution in the direction of arrow B as shown in FIG. 12. In this time, the engaging pin 11a of the eccentric bush 11, which is in contact with the one end 14c of the rotation-prohibiting portion 14b of the engaging plate 14 at the start point (P1) of the reverse rotation of the motor arm 3, separates gradually from the one end 14c of the rotation-prohibiting portion 14b during the motor arm 3 moves toward the position P2, P3, P4 from P1 and comes contact with the other end 14d of the rotation-prohibiting portion 14b of the engaging plate 14 at the time the motor arm 3 reach the position P5.

Figure 10B:
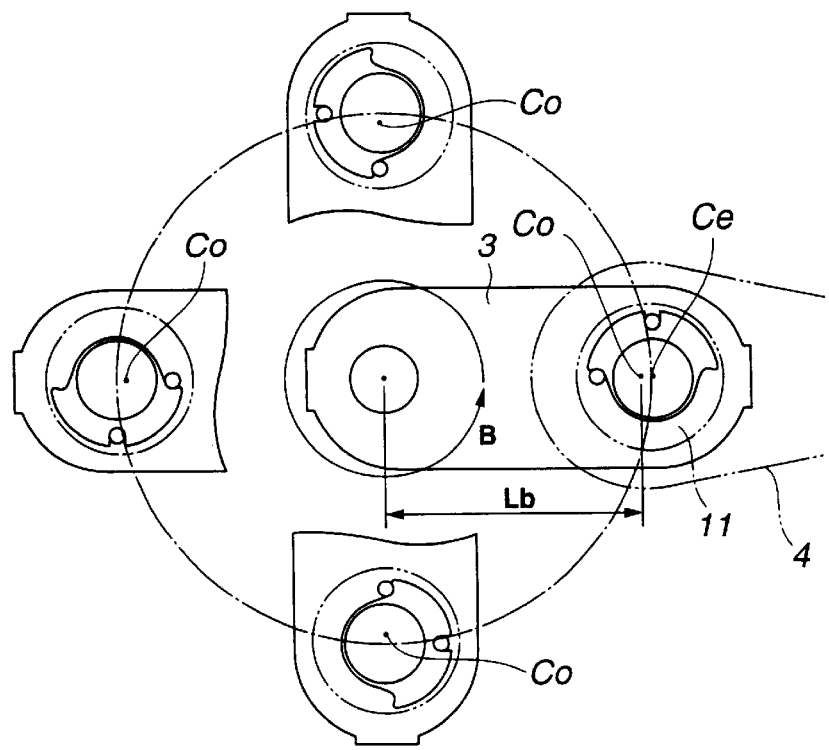
FIG. 10B is an explanatory drawing illustrating a location of the eccentric bush in the wiper linkage shown in FIG. 1 at the time of high-speed mode.

In such a manner, the eccentric bush 11 of the eccentric mechanism 10 is maintained in the state where the engaging pin 11a is in contact with the other end 14d of the engaging plate 14 during the high-speed reverse rotation of the wiper motor 2 is kept on and the motor arm 3 is rotating reversely in the direction shown by the arrow B. Whereby, the substantial length of the motor arm 3 becomes shorter into "Lb" (L−d) as compared with the substantial length "La" (L+d) in the low-speed mode, because the eccentric bush 11 is maintained in the position where the center axis Co of the eccentric bush 11 is situated more closely to the base end of the motor arm 3 as compared with the rotation axis Ce as shown in FIG. 10B. Accordingly, the wiper blade 18 is actuated swingingly on the windshield glass 20 in the wiping range Sb narrower than the wiping range Sa in the low-speed mode as shown in FIG. 11B.

Figure 11B:
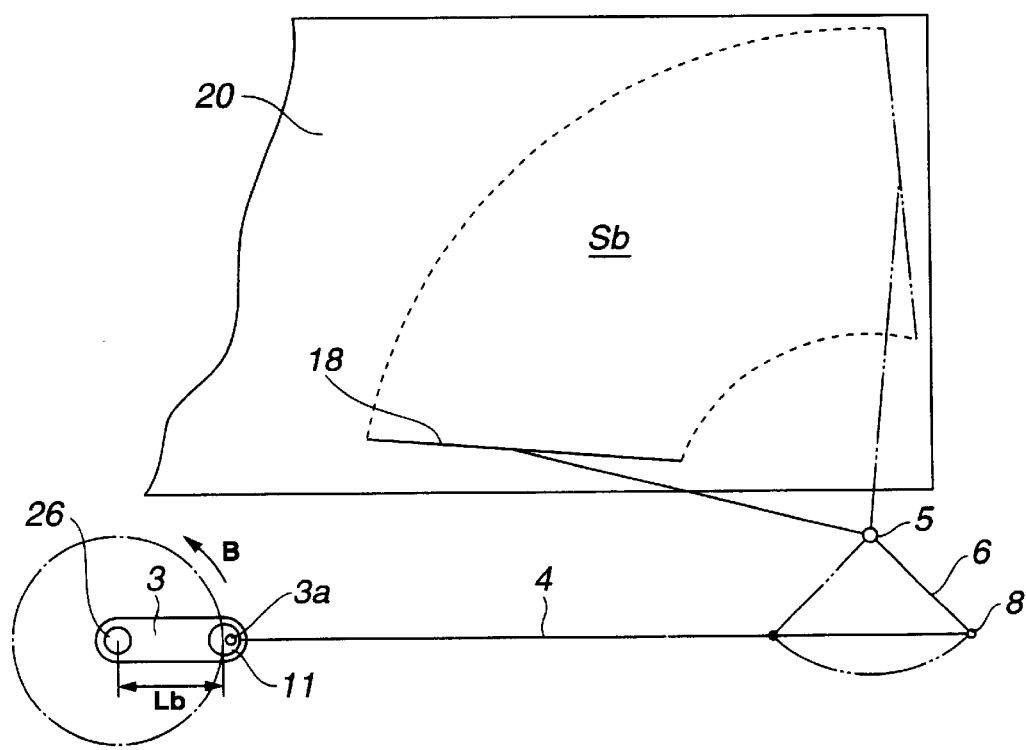
FIG. 11B is an explanatory drawing illustrating a relationship between rotational direction and length of the motor arm-and structural wiping range of the wiper blade in the wiper linkage shown in FIG. 1 at the time of high-speed mode.

The wiping ranges Sa and Sb shown in FIGS. 11A and 11B are statical and structural wiping ranges of the wiper linkage in the case of neglecting the inertial force to be caused in the actual operation of the wiper apparatus, therefore it is possible to remove the difference in the dynamic wiping range enlarged by addition of the inertial force of the wiper blade and so at the actual operation between the low-speed mode and the high-speed mode by regulating the difference between the wiping ranges Sa and Sb, that is the eccentricity "d" of the eccentric bush 11 according to the inertial force of the linkage.

When the wiper switch 31 is operated into the low-speed mode (LOW) from the high-speed mode (HI) in the state where the wiper blade 18 is actuated in the high speed (high-speed mode), the controller 37 interrupts the output signal from the high-speed driving signal output port P8 and outputs the low-speed driving signal from the low-speed driving signal output port P6 when the wiper blade 18 arrives at the lower turning position. Namely, the output signal from the controller 37 is switched over to the low-speed driving signal from the high-speed driving signal at the time when the wiper blade 18 arrives at the lower turning position and the negative going edge (H→L) is generated in the position signal supplied into the position signal monitoring port P5 according to the separation from the high-potential plate 27b and the contact with the first opening S1 of the movable contact 28a (which is moving in the counter-clockwise direction in FIG. 9 slidingly on the high-potential plate 27b and the low-potential plate 27e according to the high-speed reverse rotation of the wiper motor 2) of the position switch 29.

In accordance with the changeover of the output signal, the transistor TR1 is changed into the off-state and the transistor TR2 is changed into the on-state, thereby exciting the coil L4s of the fourth relay L4 (ON) and unexciting the coils L1s, L2s and L3s of the relays L1, L2 and L3 (OFF). Accordingly, the feeder circuit connecting the power source B and the second terminal 2a of the wiper motor 2 through the normal-closed contact L1c of the first relay L1 and grounding the first terminal 2c of the wiper motor 2 through the normal-closed contact L3c of the third relay L3 and the normal-opened contact L4o of the fourth relay L4 as shown in FIG. 6, and the high-speed reverse rotation of the wiper motor 2 is switched over into the low-speed forward rotation.

Figure 13:
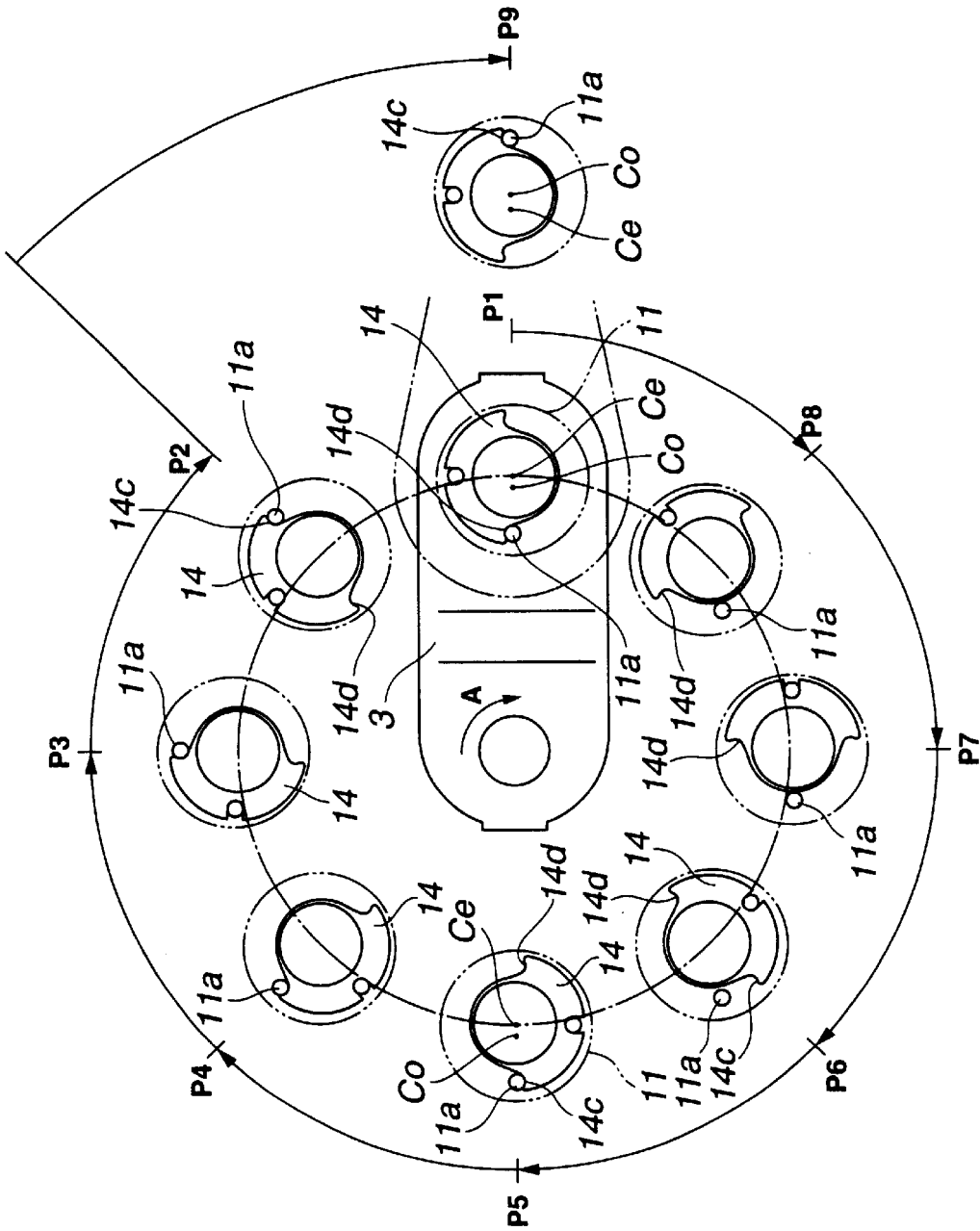
FIG. 13 is an explanatory drawing illustrating revolution of the eccentric metal at the time of switching the wiper mode from high-speed mode into the low-speed mode by the eccentric mechanism shown in FIG. 4.

When the wiper motor 2 is switched over into the low-speed forward rotation from the high-speed reverse rotation and the motor arm 3 begins to rotate in the forward direction, the eccentric bush 11 starts counter-clockwise rotation against the motor arm 3 together with the retainer 12 fixed to the link connecting rod 4 according as the motor arm 3 moves from the position P1 to the position P8, P7 . . . P2, P9 in order and makes one revolution in the direction of arrow A as shown in FIG. 13. According revolution of the motor arm 3, the engage pin 11a of the eccentric bush 11 separates from the other end 14d of the rotation-prohibiting portion 4b of the engaging plate 14 gradually during the motor arm 3 moves toward the position P8, P7, P6 from the position P1 where the engaging pin 11a is in contact with the other end 14d of the engaging plate 14, and comes contact with the one end 14c of the engaging plate 14 at the time the motor arm 3 reach the position P5.

After this, the eccentric bush 11 is maintained in the state where the engaging pin 11a is in contact with the one end 14c of the engaging plate 14 during the low-speed forward rotation of the wiper motor 2 is kept on and the motor arm 3 is rotating forwardly in the direction shown by the arrow A and the eccentric bush 11 is held in the position where the center axis Co is situated more closely to the top end of the motor arm 3 as compared with the rotation axis Ce as shown in FIG. 10A. Therefore, the substantial length of the motor arm 3 restores into "La" (L+d) and the wiper blade 18 is actuated on the windshield glass 20 in the wiping range Sa shown in FIG. 11A. Consequently, the dynamic wiping range at the actual operation enlarged in some degree by addition of relatively small inertial force at the low speed operation to the wiping area Sa becomes equivalent to the actual wiping range in the high-speed mode enlarged by relatively large inertial force at the high speed operation.

In the aforementioned wiper apparatus, it is possible to detect the position of the wiper blade 18 accurately because of using the wiper motor 2 provided with position-detecting conductive plates 27 comprising the high-potential plate 27b, the low-potential plate 27e and the common plate 27c as mentioned above, and it is possible to stop the wiper blade 18 at the lower turning position, that is the home position very accurately in response of the off-operation of the wiper switch 31, possible to correctly change the rotational direction of the wiper motor 2 at the upper turning position or the lower turning position in response to the switching operation of the wiper switch 31 into the high-speed mode from the low-speed mode, thereby enabling the speedy changeover of the wiper mode, furthermore an unnatural phenomenon in that the wiper blade 18 returns in the middle on the windshield glass 20 can be solved.

As described above, the wiper motor according to this invention is provided with position-detecting conductive plates composed of the semi-ringshaped high-potential plate, the similarly semi-ringshaped low-potential plate disposed oppositely to the high-potential plate and the common plate disposed at the center between aforesaid both plates as components for the position switch, therefore, it becomes possible to detect signal change from the common plated at the time when the wiper blade arrives at the lower turning position and the upper turning position by setting respective two openings formed between the high and low-potential plates of the position switch in correspondence to the lower turning position and the, upper turning position of the wiper blade so that the movable contact of the position switch may comes in contact with the openings when the wiper blade arrives in the lower and upper turning positions, respectively. Therefore, it is possible to stop the wiper blade automatically at the lower turning position and possible to switch the rotational speed and direction of the wiper motor at the same time of arrival of the wiper blade in the lower turning position or the upper turning position by stopping or reversing the rotation of the wiper motor in response to the signal change, and excellent effect can be obtained in that it is possible to change the wiper mode speedily and to prevent the wiper blade to change the direction in the middle of the wiping range on the windshield glass.

In the wiper motor according to a preferred embodiment of this invention, the connecting plate portion of the common plate is extended through one of two openings between the high and low-potential plates, therefore it is possible to dispose the three plates on the same plane and possible to simplify the position switch in construction. In the wiper wiper motor according to the other preferred embodiment of this invention, a first opening of the two openings corresponds to the lower turning position of the wiper blade, a second opening (another opening) of the two openings corresponds to the upper turning position of the wiper blade, and the connecting plate portion of the common plate is extended through the second opening corresponding to the upper turning position, therefore it is possible to make the first opening corresponding to the lower turning position narrower than the second opening and possible to automatically stop the wiper blade at the lower turning position (home position) more accurately.

What is claimed is:

1. A wiper apparatus, said apparatus comprising a wiper motor for swinging a wiper blade reciprocatingly at high and low speeds through a wiper linkage provided with a motor arm secured to an output shaft of said wiper motor on a base end side thereof, an eccentric mechanism including an eccentric bush supported eccentrically and rotatably about a shaft secured on a top end side of said motor arm and a retainer rotatably fitted on an outer periphery of said eccentric bush for moving the eccentric bush so as to increase substantial length of said motor arm according to forward rotation of said motor in a low speed and to decrease the substantial length of said motor arm according to reverse rotation of said motor in a high speed, a link connecting rod rotatably connected to the motor arm through said eccentric mechanism at one end thereof, a pivot shaft attached with said wiper blade and supported rotatably, and a pivot arm secured to said pivot shaft on a base end side thereof and rotatably connected to another end of said link connecting rod on a top end side thereof; said wiper motor comprising a position detecting switch composed of a semi-ringshaped high-potential plate connected to a power source, a semi-ringshaped low-potential plate grounded and disposed oppositely to said high-potential plate, a common plate disposed in a center part between said high and low-potential plates and a movable contact electrically connected to said common plate and rotating in a state of being in contact with said high or low-potential plate selectively according to movement of said wiper blade.

2. A wiper apparatus as set forth in claim 1, wherein a connecting plate portion formed to said common plate and functioning as an electric-conductive path is extended from the common plate through one of two openings formed between said high and low-potential plates.

3. A wiper apparatus as set forth in claim 2, wherein a first opening of said two openings formed between said high and low-potential plates corresponds to a lower turning position of said wiper blade, a second opening of said two openings corresponds to an upper turning position of said wiper blade, and said connecting plate portion of the common plate is extended through the second opening corresponding to the upper turning position of the wiper blade.

* * * * *